United States Patent [19]

Eschbach et al.

[11] Patent Number: 5,631,103

[45] Date of Patent: May 20, 1997

[54] HIGHLY FILLED SOLID POLYMER ELECTROLYTE

[75] Inventors: Florence O. Eschbach; Manuel Oliver; Ganesh Venugopal, all of Duluth; Shekhar Pendalwar, Lawrenceville, all of Ga.

[73] Assignee: Motorola, Inc., Schaumburg, Ill.

[21] Appl. No.: 720,062

[22] Filed: Sep. 27, 1996

[51] Int. Cl.$^6$ ................................................ H01M 6/18
[52] U.S. Cl. .................................. 429/190; 429/192
[58] Field of Search .......................... 429/190, 192, 429/194, 198; 252/62.2

[56] References Cited

U.S. PATENT DOCUMENTS 5,360,686  11/1994  Peled et al. .......................... 429/191
5,456,000  10/1995  Gozdz et al. ......................... 29/623.2
5,470,677  11/1995  Williams et al. ...................... 429/190

*Primary Examiner*—M. Nuzzolillo
*Attorney, Agent, or Firm*—Kenneth M. Massaroni

[57] ABSTRACT

An electrochemical cell (10) includes first and second electrodes (12) and (14) with an electrolyte system (26) disposed therebetween. The electrolyte system includes at least a filler material and a gelling polymer. The filler material comprises at least about 50 vol. % of the total amount of polymer in the electrolyte system, and has a porosity on the order of about 20–80%.

23 Claims, 2 Drawing Sheets

HIGHLY FILLED SOLID POLYMER ELECTROLYTE

TECHNICAL FIELD

This invention relates in general to the field of electrolytes for electrochemical cells, and more particularly to methods of making electrochemical cells using polymer gel electrolytes.

BACKGROUND OF THE INVENTION

There has been a great deal of interest in developing better and more efficient methods for storing energy for applications such as cellular communication, satellites, portable computers, and electric vehicles to name but a few. Accordingly, there has been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivities tend to leak out of the cells into which they are sealed. While better manufacturing techniques have lessened the occurrence of leakage, cells still do leak potentially dangerous liquid electrolytes from time to time. Moreover, any leakage lessens the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitudes poorer than a liquid electrolyte. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. One processing route that can be used to assemble a battery with a gel electrolyte is to leave the electrolyte salt and solvent out of the polymer gel system until after the cell is completely fabricated. Thereafter, the solvent and the electrolyte salt may be introduced into the polymer system in order to swell and activate the battery. While this approach (which is described in, for example, U.S. Pat. No. 5,456,000 issued Oct. 10, 1995) has the advantage of allowing the cell to be fabricated in a non-dry environment (the electrolyte salt in a lithium cell is typically hygroscopic) it offers problems with respect to performance and assembly. The gel electrolyte may lack sufficient mechanical integrity to prevent shorting between the electrodes while they are being bonded or laminated together with the electrolyte. The electrolyte layer thickness is typically on the order of 75 µm, presumably to overcome this shorting problem and to help facilitate handling of the electrolyte material. When compared to the 25 µm thickness typical for separators used in liquid lithium ion cells, this results in a significant reduction in the volumetric energy density for the cell.

Accordingly, there exists a need for anew electrolyte system which combines the properties of good mechanical integrity, as well as the ability to absorb sufficient amounts of electrolyte active species so as to produce an electrolyte with the high ionic conductivity characteristics of liquid electrolytes. The electrolytes so formed should also avoid excessive swelling and all of the problems associated therewith.

DETAILED DESCRIPTION OF THE PREFERRED EMBODIMENT

Figure 1:
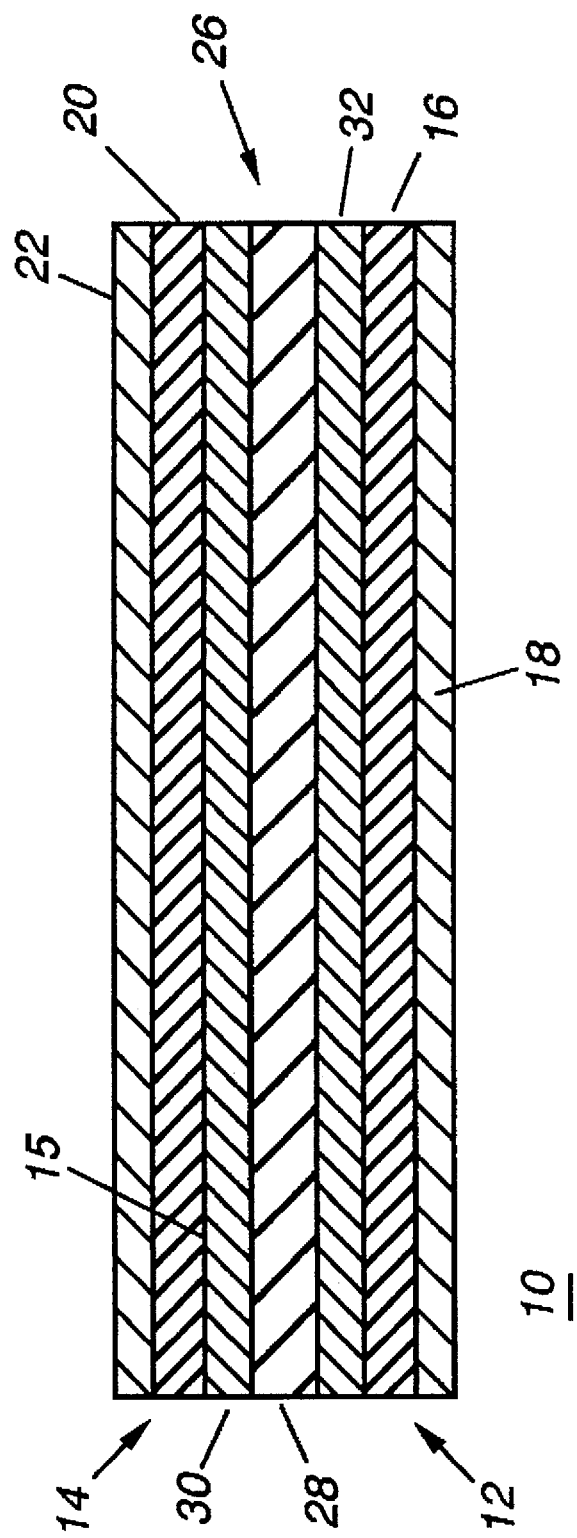
FIG. 1 is a cross-sectional side view of an electrochemical cell in accordance with this invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross-sectional side view of a gel electrolyte electrochemical cell in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, intercalation materials such as carbon, graphite, and other forms of carbon known in the art. In one preferred embodiment, the anode 12 is fabricated of an amorphous carbonaceous material such as that disclosed in commonly assigned, copending U.S. patent application Ser. No. 08/561,641 entitled "Improved Carbon Electrode Materials For Lithium Battery Cells and Method of Making Same," filed on Nov. 22, 1995, in the names of Jinshan Zhang, et al., the disclosure of which is incorporated herein by reference.

More particularly, the anode 12 comprises a layer of carbon material as described hereinabove deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper.

The second electrode 14 may be adapted to be the cathode of a lithium rechargeable cell. In such an instance, the cathode is fabricated of a lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, copending U.S. patent application Ser. No. 08/464,440 in the name of Zhenhua Mao, filed Jun. 5, 1995, now U.S. Pat. No. 5,591,548 the disclosure of which is incorporated herein by reference.

Both the anode and the cathode are fabricated so as to include an amount of a polymer binder material. The binder material is provided to assure adhesion between the particles of the electrode active material. The binder material is preferably a polymeric binder material such as that from which the electrolyte layer is fabricated, and may gel or absorb some amount of an electrolyte active species. The electrodes may also include some measure of a conductivity enhancing agent such as carbon black.

Disposed between electrodes 12 and 14 is a layer of an electrolyte material system 26. The electrolyte material system 26 comprises an electrolyte active species and a multi-phase polymer support structure consisting of a gelling polymer and a filler material. The filler may be a first polymer which is a substantially inert phase. The inert phase 28 is provided to give mechanical integrity and structural rigidity to the electrolyte system. The gelling polymer is provided as a binder, and absorbs the electrolyte active species, swelling as it is absorbed. It is important to note that, in contrast to other, prior art gel electrolytes, the filler material is present in substantially higher amounts, i.e., greater than 50 wt %, than would ordinarily be considered operative for gel electrolytes. The filler preferably comprises about between 50 and 90 volume % (vol. %) of the polymer support structure, and preferably between 75 and 85 vol. %. The higher proportion of filler is offset, at least in part, by the porosity of the filler which is between about 20 and 80%.

The gelling polymer is gelled in the presence of an electrolyte active species. The electrolyte active species is a liquid or solid component (or both) which provides ionic conductivity between the anode and the cathode. In the embodiment in which the electrochemical cell 10 is a lithium intercalation cell, the electrolyte active species is a liquid, and consists of an alkali metal salt in a solvent. Typical alkali metal salts include, but are not limited to, salts having the formula $M^+X^-$, where $M^+$ is an alkali metal cation such as $Li^+$, $Na^+$, $K^+$, and combination thereof; and $X^-$ is a anion such as $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_3^-$ and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, n-methyl-2-pyrrolidone (NMP), acetone and combinations thereof. For other electrode combinations, i.e., Ni-Cd or Ni-metal hydride, other electrolyte active species may be used, such as KOH.

Figure 2:
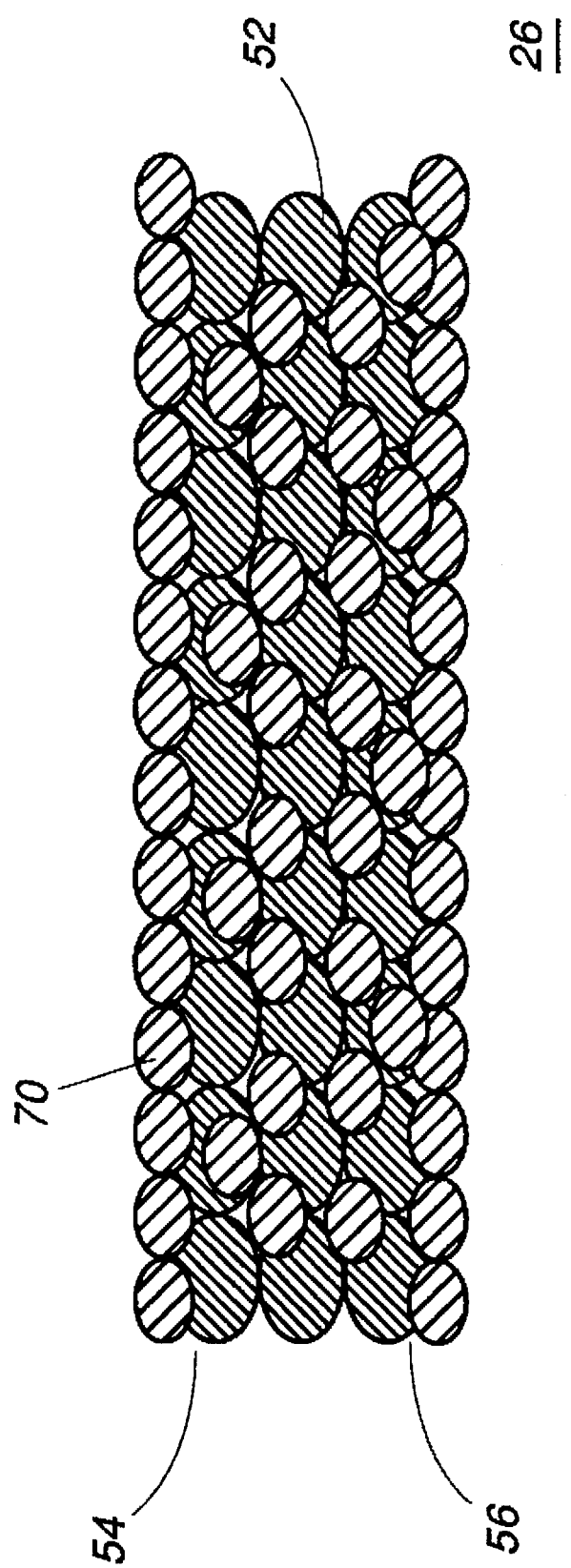
FIG. 2 is a cross-sectional side view of an electrolyte system for an electrochemical cell, in accordance with the invention.

Referring now to FIG. 2, the electrolyte system 26 comprises a filler 52 which is preferably formed of an inert polymer material. The term inert refers to the fact that the material itself is not gellable though the material, due to its porosity (as described above) may be absorbing. This inert component may be fabricated or selected from the group of materials consisting of polyalkenes such as polyethylene, polypropylene, polytetrafluoroethylene, polystyrene, polyethyleneterephthalate, ethylene propylene diene monomer, (EPDM) nylon, hollow plastic microspheres and combinations thereof. Alternatively, inert layer 52 may be fabricated of an inert, inorganic material, examples of which include alumina, silica, amorphous silica, calcium, carbonate, hollow glass microspheres, and combinations thereof.

Dispersed throughout the filler is the gelling polymer. The gelling polymer is an absorbing or gel-forming polymer 70. The absorbing or gel-forming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetrafluoroethylene, glycol diacrylate, copolymers of any of the foregoing, and combinations thereof. As illustrated in FIG. 2, a layer of gelling polymer 70 is also disposed on surfaces 54 and 56 of layer 52.

In fabricating the highly filled polymer gel electrolytes described above, it has been found that it is necessary to maintain a homogenous mixture of the filler material and the gelling polymer. It has also been noted in the prior art that the temperatures at which the filler and gelling polymer are miscible is often so high that deleterious reactions occur, compromising the capabilities of the material. Hence, the filler and gelling polymer herein are mixed in the presence of a processing aid adapted to reduce the resulting processing temperature of the gelling polymer, for example, PVDF. Examples of acceptable processing aids include, propylene carbonate, (PC), dibutyl phthalate, ethylene carbonate (EC), diethyl phthalate, dipropyl phthalate, dioctyl phthalate, and combinations thereof. Using dibutyl phthalate, the melting point of PVDF, as determined by differential scanning calorimetry, is reduced from about 160° C. to 139° C.; and using PC drops the melting point to 83°. It should be noted that the processing aid may be a liquid or solid that is a solvent, a latent solvent or a plasticizer for the gelling polymer.

The electrodes and separator materials described above may be fabricated into electrochemical cells by winding and/or stacking the layers of electrodes and separator materials. Discrete cells are then packaged between sheets of a vapor impermeable package.

The battery cell is then cured by exposing it both to a compression and heating step. More particularly, the packaged discrete battery cell is exposed to a temperature of between 50° and 150° C. for a period of time between 6 and 3600 seconds. The exact time will depend upon the size of the cells themselves. The compression weight is typically between 1 and 500 lbs/cm² and preferably between 50 and 100 lbs/cm². This heating and pressing step results in the polymer support structure being cured into continuous semi-liquid layers between the respective electrodes. When the cell cools and solidifies, or "gels" it serves the additional function of adhering the layers of electrode material to the support structure.

The invention may be better understood from a perusal of the examples of which are attached hereto:

EXAMPLES

Example 1

In this example, a highly filled polymer gel electrolyte was fabricated. The polymer support structure included PVDF as the gelling polymer, and amorphous silica as the filler. The filler to PVDF volume ratio was 80:20. The PVDF was Kynar 461 from Elf Atochem, while the filler was a commercially available amorphous silica called HiSil SBG from PPG Industries, and had a tap density of 0.26 g/cc and a mean particle diameter of 12 mm.

The PVDF (13 volume %), filler (50 volume %) and a processing aid, specifically dibutyl phthalate (DBP) (37 volume %) were mixed in a Haake Mixer at 140° C. for 30 minutes. The resulting mixture was removed from the mixing chamber and formed into a film by pressing in a hot press at 150° C. to give a clear homogenous film. The processing aid was removed from the film by soaking in ether for two minutes. After drying off the ether at room temperature, a smooth, wrinkle free film was obtained. This film had shrunk only by about 13%, in contrast to about 30% shrinkage of a PVDF film without filler. The film was opaque white in appearance and absorbed about 118 percent of its weight of propylene carbonate (PC) at room temperature, indicating that it has a highly porous structure.

Example 2

In this example, a highly filled polymer gel electrolyte was fabricated. The polymer support structure included PVDF as the gelling polymer, and amorphous silica as the filler. The filler to PVDF volume ratio was 80:20. The PVDF was Kynar 461 from Elf Atochem, while the filler was a commercially available amorphous silica called HiSil SBG from PPG Industries, and had a tap density of 0.26 g/cc and a mean particle diameter of 12 mm.

The PVDF (14 volume %), Filler (53 volume %) and a processing aid, specifically dibutyl phthalate (DBP) (33 volume %) were mixed in a Haake Mixer at 140° C. for 25 minutes. The resulting mixture was removed from the mixing chamber and formed into a film by pressing in a hot press at 150° C. to give a clear homogenous film. The processing aid was removed from the film by soaking in ether for two minutes. After drying off the ether at room temperature, a smooth, wrinkle free film was obtained. The film was opaque white in appearance and absorbed about 93 percent of its weight of PC at room temperature, indicating that it has a highly porous structure.

Example 3

In this example, a highly filled polymer gel electrolyte was fabricated. The polymer support structure included PVDF as the gelling polymer, and amorphous silica as the filler. The filler to PVDF volume ratio was 80:20. The PVDF was Kynar 461 from Elf Atochem, while the filler was a commercially available amorphous silica called HiSil SBG from PPG Industries, and had a tap density of 0.26 g/cc and a mean particle diameter of 12 mm.

The PVDF (14 volume %), filler (57 volume %) and a processing aid, specifically dibutyl phthalate (DBP) (29 volume %) were mixed in a t-Iaake Mixer at 140° C. for 30 minutes. The resulting mixture was removed from the mixing chamber and formed into a film by pressing in a hot press at 150° C. to give a clear homogenous film. The processing aid was removed from the film by soaking in ether for two minutes. After drying off the ether at room temperature, a smooth, wrinkle free film was obtained. The film was opaque white in appearance and absorbed about 81 percent of its weight of PC indicating that it has a highly porous structure.

Example 4

In this example, a highly filled polymer gel electrolyte was fabricated. The polymer support structure included PVDF as the gelling polymer, and amorphous silica as the filler. The filler to PVDF volume ratio was 80:20. The PVDF was Kynar 461 from Elf Atochem, while the filler was a commercially available amorphous silica called HiSil SBG from PPG Industries, and had a tap density of 0.26 g/cc and a mean particle diameter of 12 mm.

The PVDF (19 volume %), filler (44 volume %) and a processing aid, specifically dibutyl phthalate (DBP) (37 volume %) were mixed in a Haake Mixer at 140° C. for 30 minutes. The resulting mixture was removed from the mixing chamber and formed into a film by pressing in a hot press at 150° C. to give a clear homogenous film. The processing aid was removed from the film by soaking in ether for two minutes. After drying off the ether at room temperature, a smooth, wrinkle free film was obtained. The film was opaque white in appearance and absorbed about 84 percent of its weight of PC indicating that it has a highly porous structure.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable electrochemical cell including an anode, a cathode and an electrolyte system, said electrolyte system comprising: a polymeric support structure comprising at least 50 vol. % of a filler material and a gelling polymer; and
   an electrolyte active species dispersed through at least said gelling polymer.

2. A rechargeable electrochemical cell as in claim 1, wherein said electrolyte active species is a liquid.

3. A rechargeable electrochemical cell as in claim 2, wherein said electrolyte active species comprises an electrolyte salt dispersed in an organic solvent.

4. A rechargeable electrochemical cell as in claim 3, wherein said solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

5. A rechargeable electrochemical cell as in claim 3, wherein said electrolyte salt is of the formula $M^+X^-$, wherein $M^+$ is selected from the group of $Li^+$, $Na^+$, $K^+$, and $X^-$ and is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_3^-$ and combinations thereof.

6. A rechargeable electrochemical cell as in claim 1, wherein said filler material is selected from the group consisting of polyethylene, polypropylene, polytetrafluroethylene, polystyrene, polyethyleneterephthalate, ethylene propylene diene monomer (EPDM), nylon, amorphous silica, alumina, calcium carbonate, hollow glass microspheres, and combinations thereof.

7. A rechargeable electrochemical cell as in claim 1, wherein said gelling polymer is selected from the group of materials consisting of polyvinylidene fluoride (PVDF), polyurethane, polyethylene oxide, polyvinylpyrrolidone, polytetraethylene glycol diacrylate, copolymers of any of the foregoing, and combinations thereof.

8. A rechargeable electrochemical cell as in claim 1, wherein said filler material preferably comprises between 50 and 90 vol. % of said polymer support structure.

9. A rechargeable electrochemical cell as in claim 1, wherein said filler material preferably comprises between 75 and 85 vol. % of said polymeric support structure.

10. A rechargeable electrochemical cell as in claim 1, wherein the porosity of the filler material is preferably between 20 and 80%.

11. An electrolyte system for a rechargeable electrochemical cell, said electrolyte system comprising:
    a polymeric support structure including at least 50 wt % of a filler material selected from the group consisting of polyethylene, polypropylene, polytetrafluoroethylene, polystyrene, polyethyleneterephthalate, ethylene propylene diene monomer, nylon, and combinations thereof, and a gelling polymer selected from the group consisting of polyvinylidene fluoride (PVDF), polyurethane, polyethylene oxide, polyacrylonitrile, polymethylacrylate, polyacrylamide, polyvinylacetate, polyvinylpyrrolidone, polytetraethylene, glycol diacrylate, copolymers of any of the foregoing, and combinations thereof; and an electrolyte active species dispersed through at least said gelling polymer.

12. An electrolyte as in claim 11, wherein said filler material preferably comprises between 50 and 90 vol. % of said polymer support structure.

13. An electrolyte as in claim 11, wherein said filler material preferably comprises between 75 and 85 vol. % of said polymeric support structure.

14. An electrolyte as in claim 11, wherein said electrolyte active species is a liquid.

15. An electrolyte as in claim 14, wherein said electrolyte active species comprises an electrolyte salt dispersed in an organic solvent.

16. An electrolyte as in claim 15, wherein said solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

17. An electrolyte as in claim 15, wherein said electrolyte salt is of the formula $M^+X^-$, wherein $M^+$ is selected from the group of $Li^+$, $Na^+$, $K^+$, and $X^-$ and is selected from the group consisting of $Cl^-$, $Br^-$, $I^-$, $ClO_4^-$, $BF_4^-$, $PF_6^-$, $ASF_6^{31}$, $SbF_6$, $CH_3CO_2-$, $CF_3SO_3^-$, $N(CF_3SO_2)_2^-$, $C(CF_3SO_2)_3^-$ and combinations thereof.

18. An electrolyte as in claim 11, wherein the porosity of the filler material is preferably between 20 and 80%.

19. A method of forming a highly filled polymer gel electrolyte for a rechargeable electrochemical cell comprising the steps of:

providing a mixture of an inert filler material;

a gelling polymer; and a processing aid, wherein the filler comprises at least 50 vol. % of the total mixture;

providing a processing aid;

heating said mixture and said processing aid to a temperature sufficient to melt at least said gelling polymer;

forming said mixture into a free standing film; and removing an residual processing aid from said film.

20. A method as in claim 19, wherein said filler material is a polymer material selected from the group consisting of polyethylene, polypropylene, polytetrafluroethylene, polystyrene, polyethyleneterephthalate, ethylene propylene diene monomer, nylon, amorphous silica, alumina, calcium carbonate, hollow glass microspheres, and combinations thereof.

21. A method as in claim 19, wherein said gelling polymer is selected from the group of materials consisting of polyvinylidene fluoride (PVDF), polyurethane, polyethylene oxide, polyvinylpyrrolidone, polytetraethylene glycol diacrylate, copolymers of any of the foregoing, and combinations thereof.

22. A method as in claim 19, wherein said filler material preferably comprises between 50 and 90 vol. % of said mixture.

23. A method as in claim 19, wherein said processing aid is selected from the group of propylene carbonate, dibutyl phthalate, ethylene carbonate, diethyl phthalate, dipropyl phthalate, dioctyl phthalate, and combinations thereof.

* * * * *